United States Patent [19]
Barchi

[11] 4,089,296
[45] May 16, 1978

[54] APPARATUS FOR SPREADING FOAM MATERIAL

[75] Inventor: Henry J. Barchi, Yardley, Pa.

[73] Assignee: Congoleum Corporation, Kearny, N.J.

[21] Appl. No.: 639,035

[22] Filed: Dec. 9, 1975

[51] Int. Cl.$^2$ ............................ B05C 3/00; B32B 5/18

[52] U.S. Cl. .................................... 118/413; 118/415; 156/78

[58] Field of Search ............... 118/413, 414, 415, 123, 118/126, 467; 156/78, 79; 427/244; 425/4 R, 4 C

[56] References Cited

U.S. PATENT DOCUMENTS

| | | | |
|---|---|---|---|
| 2,426,572 | 8/1947 | Alderper | 118/413 |
| 2,910,724 | 11/1959 | Grajeck | 118/413 X |
| 2,992,627 | 7/1961 | Ring | 118/413 |
| 3,181,199 | 5/1965 | Voelker | 156/78 X |
| 3,235,400 | 2/1966 | Voelker | 118/415 UX |
| 3,526,535 | 9/1970 | Plumat | 118/407 X |
| 3,604,394 | 9/1971 | Ohno et al. | 118/415 |
| 3,793,102 | 2/1974 | Day | 156/78 |
| 3,969,780 | 7/1976 | Henderson | 118/415 X |

FOREIGN PATENT DOCUMENTS

| | | | |
|---|---|---|---|
| 38-1481 | 2/1963 | Japan | 156/79 |

OTHER PUBLICATIONS

IBM Technical Disclosure Bulletin, vol. 16, No. 9, Feb. 1974, Saturated Vapor Doctor Blade Assembly, R. W. Nuper & A. F. Schmeckenbocher.

*Primary Examiner*—James Kee Chi
*Attorney, Agent, or Firm*—Richard T. Laughlin

[57] ABSTRACT

A process for spreading foam material relatively free of undesirable air bubbles, blisters, and blotches, and substantially uniformly in thickness across the full width of continuously advancing sheet material comprising: supplying foam material having a predetermined density to a chamber for containing foam material: filling the chamber substantially completely with the foam material at the predetermined density; maintaining the predetermined density of the foam material in the chamber substantially constant from point of entry thereto to point of exit therefrom; delivering the foam material from the chamber and spreading it relatively free of undesirable air bubbles, blisters, and blotches, and substantially uniformly in thickness across the full width of continuously advancing sheet material; and regulating and controlling the amount and the thickness of the foam material being spread on the continuously advancing sheet material, the regulating and controlling taking place immediately following the delivering of the foam material. Coating apparatus for spreading the foam material is also included.

5 Claims, 3 Drawing Figures

APPARATUS FOR SPREADING FOAM MATERIAL

THE FIELD OF THE PRESENT INVENTION

The present invention relates to improved coating processes and apparatus for spreading foam material on continuously advancing sheet material and, more particularly, is concerned with improved coating processes and apparatus for spreading foam material substantially uniformly in amount and in thickness, and relatively free of undesirable air bubbles, blisters, or blotches, in the form of large or irregular spots or blemishes, across the full width of the continuously advancing sheet material.

THE GENERAL BACKGROUND OF THE PRESENT INVENTION

Foam materials have been coated on or spread on various types of sheet materials, for example, as wear layers or facings, or as cushioning layers or backings, in the manufacture of floor coverings, such as carpets and rugs, or other articles, such as desk, table, or counter tops, wall coverings, book covers, decorative containers, fabrics for use as upholstery, clothing, and automotive interiors, etc.

In such coating or spreading operations, it is normally desired that substantial uniformity of the amount and the thickness of the coating be obtained and that the final foam layer be relatively free of undesirable air bubbles, blisters, or blotches, in the form of large or irregular spots or blemishes, which would seriously detract from the appearance and the properties of the final product and unfortunately reduce its commercial acceptability.

Such objectionable features of non-uniformity and undesirable air bubbles, blisters, and blotches, in the form of large or irregular spots or blemishes, were all the more pronounced in the spreading or coating of foam materials on relatively wide sheets of material. In such an operation, a traversing supply mechanism was usually employed to accumulate a pile or mass of foam material in a reciprocating back-and-forth motion behind a relatively wide doctor bar, roll, or blade, in order to accomodate the relatively wide width of the sheet material. The reciprocating back-and-forth motion appeared to increase the non-uniformity and the number of the undesirable air bubbles, blisters, and blotches in the final foam product.

PURPOSES AND OBJECTS OF THE PRESENT INVENTION

It is therefore a principal purpose and object of the present invention to provide improved coating processes and apparatus for spreading foam materials substantially uniformly in amount and in thickness and relatively free of undesirable air bubbles, blisters, and blotches, in the form of large or irregular spots or blemishes, across the full width of relatively wide, continuously advancing sheet materials. Other principal purposes and objects of the present invention will become clear from a further reading and understanding of this specification.

BRIEF SUMMARY OF THE PRESENT INVENTION

It has been found that such principal purposes and objects of the present invention can be achieved by: delivering foam material having a predetermined density to a chamber for containing the foam material; filling the chamber substantially completely with the foam material at the predetermined density; maintaining the predetermined density of the foam material in the chamber substantially constant from point of entry thereto to point of exit therefrom; delivering the foam material from the chamber and spreading it substantially uniformly in amount and in thickness, and relatively free of undesirable air bubbles, blisters, and blotches, in the form of large or irregular spots or blemishes, across the full width of relatively wide continuously advancing sheet materials; and regulating and controlling the amount and the thickness of the foam material being spread on the relatively wide, continuously advancing sheet material, the regulating and controlling taking place substantially immediately following the delivering of the foam material from the chamber.

BRIEF DESCRIPTION OF THE DRAWINGS

In the following specification and accompanying self-explanatory drawings, there are described and illustrated preferred embodiments of the present invention but it is to be understood that the invention, in its broader aspects, is not to be construed as limited to such preferred embodiments as disclosed, except as is determined by the scope of the appended claims.

Referring to the accompanying self-explanatory drawings.

DESCRIPTION OF THE PREFERRED EMBODIMENT OF THE PRESENT INVENTION

Figure 1:
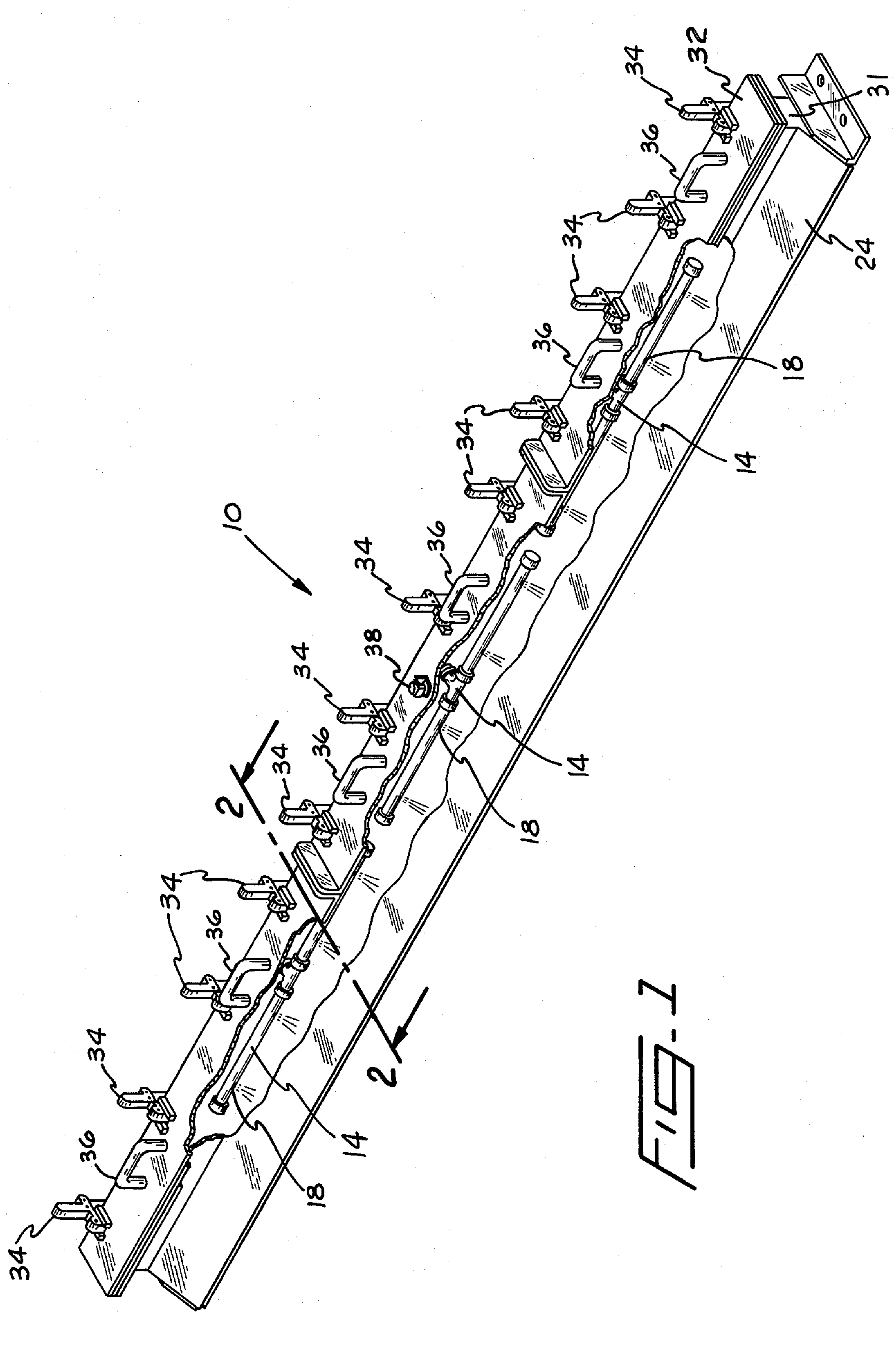
FIG. 1 is a fragmentary, partially cutaway, perspective showing of coating manifold apparatus suitable for carrying out the basic principles of the present invention, with some elements omitted in order to avoid possible undue complication of the drawing and to facilitate and expedite the understanding of the invention.
Figure 2:
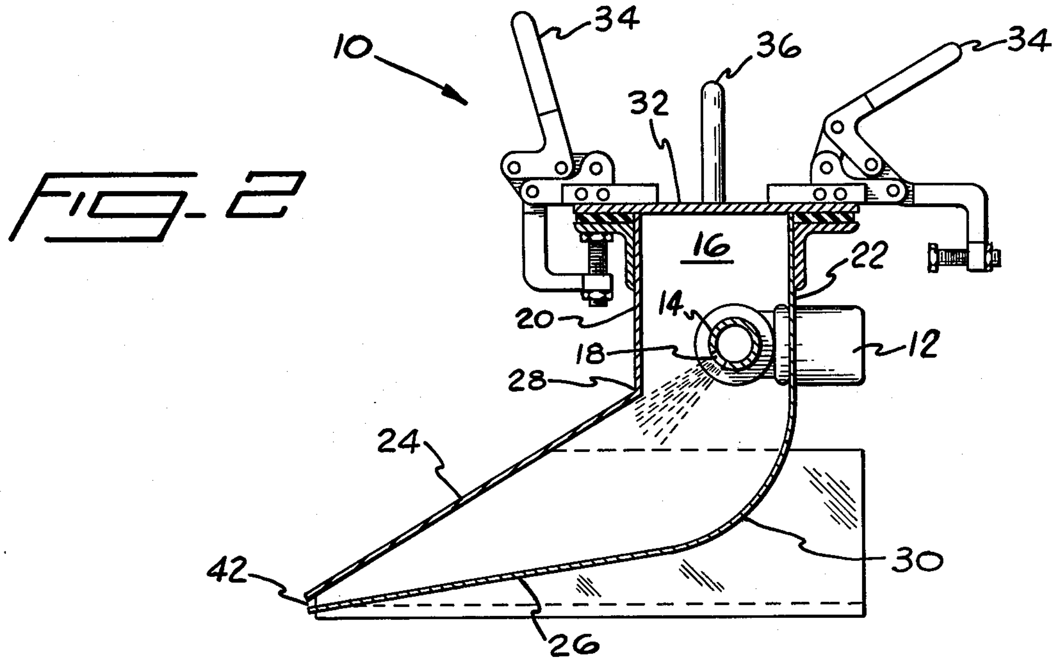
FIG. 2 is a fragmentary, cross-sectional showing of the coating manifold apparatus of FIG. 1, taken in the plane indicated by the arrows 2—2 of FIG. 1, looking in the direction indicated by the arrows.

In FIGS. 1 and 2, there is shown coating apparatus comprising a coating manifold 10 to which foam material having a somewhat viscous consistency is delivered by means of a plurality of main supply lines 12 and a plurality of individual supply pipes 14 located inside a chamber 16 of the coating manifold 10. A plurality of relatively small openings 18 are provided along the full length of the internally located supply pipes 14, through which the foam material is pumped substantially uniformly into the coating manifold chamber 16. As shown in the preferred embodiment, there are twelve openings 18 in the three supply pipes 14 which, if the total length of the coating manifold 10 were about 16 feet, places an opening 18 every 16 inches. This spacing can be increased to about one opening 18 every 20 inches or it can be decreased to one opening 18 about every 8 inches, depending upon the basic nature and consistency, and the characteristics and properties of the foam material.

THE FOAM MATERIAL

The foam material is supplied to the plurality of main supply lines 12 by any suitable, conventional, commercially available mechanical foam generator (not shown in the drawings), such as an Oakes Foam Generator. Such mechanical foam generation techniques incorporate air or other gas mechanically, as by whipping, or involve air or other gas entrapment normally using continuous mixers with normally the addition of surfactants to stablilize the foam after formation and during subsequent processing, such as fusion and/or hardening. The Oakes Continuous Mixer is an example of such an operation.

Plastisols, with their wide versatility and relative ease of handling, are normally used in such mechanical foam generation techniques. The preferred and most widely used resin present in the plastisols employed in preparing the foam materials of the present invention is polyvinyl chloride, either as a homopolymer, copolymer, terpolymer, block polymer, etc.

Many other resins, however, are also of use, either by themselves, or copolymerized with polyvinyl chloride or other vinyl resins. Such other resins include: other vinyl resins such as polyvinyl acetate, polyvinyl alcohol, etc.; polyolefins such as polyethylene and polypropylene; acrylates and methacrylates; polyamide nylons 6, 6/6, etc.; polystrene, acrylonitrile-butadiene-styrene, acrylonitrile-styrene, phenolics, ureas, epoxies, silicones, polyurethanes, etc.

THE COATING MANIFOLD CHAMBER

Figure 3:
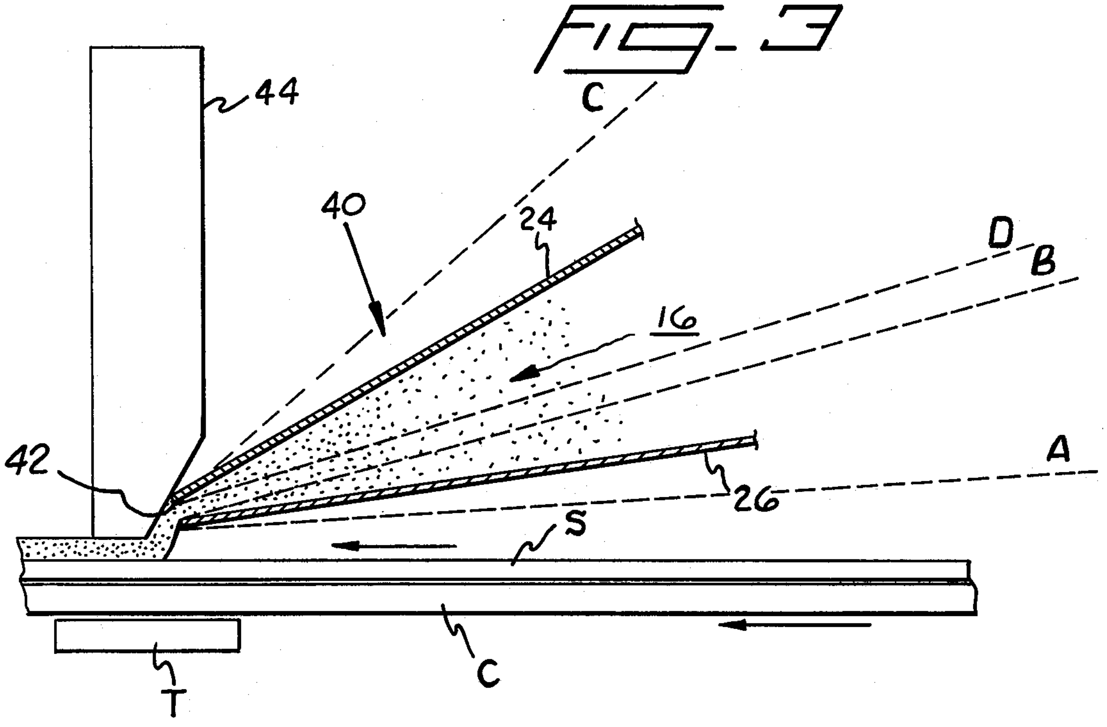
FIG. 3 is a fragmentary, schematic, cross-sectional showing, somewhat similar in general nature to FIG. 2, but drawn to a larger scale to more clearly illustrate the basic principles of the present inventive concept.

The foam material, thus generated by any suitable, conventional, commercially available mechanical foam generator, as described, is pumped from the generator through a large main supply line, then through a plurality of smaller supply lines and enters the coating manifold chamber 16, as shown in FIG. 2. The coating manifold chamber 16 is formed of two approximately vertical main side walls 20 and 22, and two sloping or slanting walls 24 and 26, which gradually and uniformly converge, as shown. Walls 20 and 24 intersect and meet in a line 28, whereas walls 22 and 26 do not meet but are joined by an arcuate transition wall 30 which, as shown in FIGS. 2 and 3, is a cylindrically curved surface having the line 28 as its axis. A pair of approximately vertical end walls 31, 31 are used to close in the ends of the coating manifold chamber 16. The top of the coating manifold chamber 16 is closed by a flat, rectangular top plate 32, which is easily removable and is adapted to be easily clamped in a closed air-tight fashion by a plurality of quick-opening toggle clamps 34, or other fastening devices located on both sides of the top plate 32.

In FIG. 2, one row of the toggle clamps 34 is shown as closed (the left hand side), whereas the other row of toggle clamps 34 (the right hand side) is shown in the open, unclamped position in order to clarify the quick action of the opening and closing of the top plate 32. One row of the toggle clamps 34 is omitted in FIG. 1, in order to make the drawing less complicated.

A plurality of hangers 36 is provided for gripping, or lifting, or otherwise handling the top plate 32, or the entire coating manifold 10, if necessary. A vent or petcock 38 is provided, preferably at the geometric center of the top plate 32. It is to be appreciated that, when the foam material is initially pumped or otherwise introduced into the coating manifold chamber 16, the vent or petcock 38 is open to the atmosphere to permit the air within the coating manifold chamber 16 to escape readily and to permit the filling of the coating manifold chamber 16 rapidly and substantially completely with the foam material. When the coating manifold chamber 16 is substantially completely filled, the petcock or vent is closed, whereby a certain amount of internal pressure is created and built up within the coating manifold chamber 16 due to the pressure of the supply or feed of the foam material being pumped through the main supply lines 12 and the inertia or the resistance to flow of the relatively viscous foam material within the coating manifold chamber 16.

The coating manifold chamber 16 is so formed and shaped by its surrounding walls that the cross-sectional area through which the foam material passes as it moves from its point of entry into the chamber 16 to its point of exit therefrom is either a constant, particularly in the upper portion thereof, or gradually and constantly decreases uniformly at a steady rate, particularly in the lower portion thereof in the volume bounded by the sloping or the slanting walls 24 and 26 which converge and combine to form a nozzle 40 which leads to a manifold opening 42 which permits the foam material to exit from the coating manifold chamber 16.

The result of such a cross-sectional configuration which remains constant, or decreases constantly and uniformly, but does not increase, maintains the density of the viscous plastisol foam material substantially at a constant value. There is, therefore, substantially no basic change in the fundamental character of the viscous plastisol foam material from the point of entry into the coating manifold chamber 16 to the point of exit therefrom.

The density of the foam material in the coating manifold chamber 16 is therefore substantially constant from point of entry to point of exit and, depending upon the nature of the original formulation of the foam material and its physical and chemical characteristics and properties, is in the range of from about 17 pounds per cubic foot to about 22 pounds per cubic foot, and preferably from about 18 pounds per cubic foot to about 20 pounds per cubic foot.

During the flow of the foam material through the coating manifold chamber 16, it is pumped or urged forwardly under a relatively low amount of pressure which does not exceed about 5 pounds per square inch gauge. In other words, the pressure drop from point of entry into the coating manifold chamber 16 to the point of exit therefrom does not exceed about 5 pounds per square inch gauge.

It is to be appreciated that such an amount of positive pressure within the coating manifold chamber 16, even though relatively low, when taken in conjunction with the construction and configuration of the chamber 16 wherein the cross-sectional area through which the foam material passes is either a constant or decreases but does not increase, prevents air from entering the chamber 16 and thus avoids the creation of undesirable air bubbles or blisters in the foam material.

Additionally, the walls of the coating manifold chamber 16 and the top plate 32 thereof fit together in an air-tight clamped fit, and with the constant, steady forward movement of the foam material into, through, and then out of the coating manifold chamber 16, no air can enter the coating manifold chamber 16 at the edges of the top plate or back in through the manifold opening or lip 42. In this way, the foam material is protected even further and its basic character remains unchanged.

However, as observed previously, the pressure urging the foam material forwardly within the coating manifold chamber 16 should be relatively low, as indicated.

The coating manifold chamber 16 and its associated parts is normally unheated and customarily is operated at room or ambient temperatures. However, if desired or required by the existing circumstances, or by the nature of the materials being used in the process, the procedures may be carried out at slightly elevated temperatures which may be ten or fifteen degrees Fahrenheit above room or ambient temperature.

THE EXTRUSION OF THE FOAM MATERIAL

As shown more clearly in FIG. 3, the coating manifold chamber 16 has an orifice or opening 42, in the form of a relatively long, narrow slit, which directly and immediately faces the slanting lower portion of a doctor bar or blade 44. The upper lip of the orifice or opening 44 is either in actual contact with the slanting lower portion of the doctor bar or blade 44, or is so close thereto as to normally preclude the escape of any substantial amount of foam material upwardly or rearwardly over the upper lip of the orifice or opening 42.

As shown, the doctor bar or blade 44 possesses substantially vertical sides, although these are not really critical as to their verticularity, and, more significantly, has a slanting lower portion and a relatively flat lower portion, as shown clearly in FIG. 3. The slanting lower portion of the doctor bar or blade 44 is shown with an angle of about 30° to the vertical but such angle may be decreased to as low as about 5° or may be increased to as much as about 60°, all measurements being taken to the vertical.

It is to be appreciated that, if the upper lip of the narrow opening or orifice 42 is to actually contact the slanting lower portion of the doctor bar or blade 44, certain angular relationships must be observed. The sloping or slanting walls 24 and 26 which form the nozzle 40 must converge at a relatively acute angle of less than about 36°, say from about 16° to about 36°, and preferably converge at an angle less than about 28°, say from about 16° to about 28°.

At the same time, the nozzle 40 formed by the sloping or slanting walls 24 and 26 must approach the doctor bar or blade 44 at a relatively sharp angle wherein the angle between the vertical face of the doctor bar or blade 44 and the sloping or slanting wall 24 is in the range of from about 50° to about 75°, and preferably from about 60° to about 75°.

Additionally, the nozzle 40 must also be directed in somewhat generally the same direction as the direction of movement of the continuously advancing sheet material S upon which the foam material is to be spread. This angle, as measured between the face of the sloping or slanting wall 26 and the surface of the continuously advancing sheet material S (as it is being carried forwardly on a belt or other carrier) is in the range of from about 4° to about 16°, and preferably from about 4° to about 10°. The belt or other carrier C moving the sheet material forwardly is a conventional, commercially available type.

These angular relationships are set forth diagrammatically in FIG. 3 of the drawings. Dotted lines A and B are 4° and 16°, respectively, above the horizontal and thus define the limits of the sloping or slanting wall 26 of the nozzle 40 with respect to the surface of the continuously advancing sheet materials S. In the same way, dotted lines C and D are 50° and 75°, respectively, to the vertical and thus define the limits of the sloping or slanting wall 24 of the nozzle 40 with respect to the vertical face of the doctor bar or blade 44. The angular relationships of the sloping or slanting walls 24 and 26 are thus limited, as noted hereinbefore, by the fact that sloping or slanting wall 24 must lie within the pie-shaped sector bounded by the lines A and B and by the fact that sloping or slanting wall 26 must lie within the pie-shaped sector bounded by the line C and D, and, further by the fact that sloping or slanting walls 24 and 26 must converge at a relatively acute angle of from about 16° to about 36°.

Under normal circumstances, the narrow opening 42 is such as to be capable of extruding a bead of foam material having a thickness of from about one-sixteenth of an inch to about one-quarter of an inch, and preferably from about one-eighth of an inch to about three-sixteenths of an inch. This bead of foam material slides against the slanting lower portion of the doctor bar or blade 44 and then passes under the lowermost flat portion of the doctor bar or blade 44 and in this way the amount and the thickness of the foam material being spread on the continuously advancing sheet material S is controlled and regulated. A machined table top surface T is positioned directly below the conveyor C where it passes under the nozzle opening or orifice, whereby the thickness of the layer of foam material is precisely and accurately controlled and regulated. Such control and regulation may be considered as taking place substantially simultaneously with the delivering of the foam material onto the sheet material S but, in any event, it may be deemed as taking place immediately following the delivering and the spreading of the foam material on the sheet material S.

Additionally, with the upper lip of the nozzle opening 42 in actual contact with the slanting lower portion of the doctor bar or blade 44, as well as being positioned very close to the continuously advancing sheet material S, the foam material is delivered with a minimum of time-exposure to air before actually being coated and spread on the continuously advancing sheet material S. In other words, the foam material is not exposed to the atmosphere for any appreciable length of time during which air may be absorbed therein, or adsorbed thereon, to increase the possibility of air bubbles or blisters in the foam material before being spread on the continuously advancing sheet material S.

THE SHEET MATERIAL

The specific nature of the sheet material upon which the foam material is spread does not relate to the essence of the present inventive concept. It may be a matted or felted fibrous sheet, a woven or nonwoven fabric, a knitted fabric, or substantially any type of sheet material, including paper and paper products. It may be formed of mineral fibers such as asbestos, glass or glass wool, mineral or slag wool, metallic threads, etc.; natural fibers of wool or of cellulosic original such as cotton; synthetic or man made fibers and/or filaments such as rayon, nylon, polyesters, polyolefins, acrylics, etc.

Following the spreading of the foam material on the continuously advancing sheet material S, the product is now forwarded for heating, fusing, curing, or any other processing, as desired or required. Such subsequent processing normally includes a heating, drying, and/or curing of the foam material in an oven or other conventional heating apparatus at an elevated temperature of from about 180° to about 500° F. for a period of time of from about 2 minutes to about 10 minutes, and preferably from about 4 minutes to about 10 minutes.

The invention will be described in greater detail by the following specific Examples. It should be understood, however, that, although these Examples may describe in particularity some of the more specific features and aspects of the present invention, they are given primarily for illustrative purposes and that the invention in its broader aspects is not to be construed as limited thereto except as defined by the scope of the appended claims.

EXAMPLE 1

The apparatus illustrated in FIGS. 1–3 is employed for this Example. An Oakes mechanical foam generator is used. It has a main supply line which subdivides into three smaller supply lines which feed into three individual supply pipes located in the interior of the coating manifold chamber. Each individual supply pipe has four openings spaced approximately 12 inches apart on centers.

The width of the coating manifold chamber is 194½ inches. The two sloping or slanting walls of the coating manifold chamber converge at an angle of 23° into a nozzle having an opening or orifice in the form of a long, narrow slit. The upper sloping or slanting wall is at an angle of 60° to the vertical face of the doctor bar or blade. The lower sloping or slanting wall is at an angle of 7° to the horizontal plane in which the continuously advancing sheet material is moving at a uniform rate. The upper lip of the opening or orifice of the nozzle formed by the two sloping or slanting walls is in actual contact with the slanting lower face of the doctor bar or blade.

The resinous composition to be used in the generation and formation of the mechanical foam material has the following composition by weight:

| | Parts per hundred |
|---|---|
| Medium molecular weight copolymer dispersion resin, approximately 14% polyvinyl acetate and approximately 86% polyvinyl chloride | 60 |
| Medium molecular weight homopolymer of polyvinyl chloride | 40 |
| Dioctylphthalate plasticizer | 80 |
| Dow Silicon # 1250 surfactant | 4 |
| Dispersion stabilizer BC 103 | 2 |
| York White Filler | 40 |
| Total | 226 |

This resinous composition, as formulated and prepared, has a specific gravity of 1.22 (76.2 pounds per cubic foot). The formulated and prepared resinous composition is passed through a a conventional, commercially available Oakes mechanical foam generator and the resulting foam material is pumped under low pressure to the main supply line to then pass through the three smaller supply lines and into the three individual supply pipes and their openings into the coating manifold chamber at room or ambient temperature.

The foam material has a substantially constant density of about 19 pounds per cubic foot from its point of entry into the coating manifold chamber to its point of exit therefrom. The pressure drop within the coating manifold chamber is less than 5 pounds per square inch gauge. The basic character of the foam material in the coating manifold chamber is substantially unchanged during its passage therethrough.

The base felt of the backing sheet material is an 0.030 inch thick fibrous sheet of matted and felted cellulosic fibers impregnated uniformly with twenty percent of polyvinyl acetate resin. The sheet of base felt backing sheet material is carried forwardly on a carrier belt of standard conventional design and moves continuously and at a uniform rate of speed to pass under the opening of the nozzle of the coating manifold chamber and substantially simultaneously under the lowermost flat portion of the doctor bar or blade. An accurately machined table top surface is positioned directly under and in contact with the belt carrier as it passes under the lowermost flat portion of the doctor bar or blade in order to assure that the sheet material is maintained at a constant predetermined distance from the lowermost flat portion of the doctor bar or blade, whereby the thickness of the layer of foam material being deposited on the sheet material is regulated and controlled very accurately. The thickness of the layer of foam material deposited on the backing sheet material is about one-eighth of an inch.

The backing sheet material with the layer of foam material well adhered thereon is then carried forwardly on a conventional belt carrier at a uniform rate of speed and is passed through a hot air circulating oven maintained at an elevated temperature of about 325° F. The period of time of exposure to the elevated temperature in the oven is about 7 minutes.

The final thickness of the dried layer of foam material is found to be satisfactorily uniform across the full width of the sheet material. It is found to be substantially free of undesirable air bubbles, blisters, and blotches, in the form of large or irregular spots or blemishes, and is considered commercially acceptable as a floor covering.

EXAMPLE II

The procedures set forth in Example I are followed substantially as described therein with the exception that the amount and the concentration of the York White filler is increased, whereby the specific gravity of the formulated resinous composition is also increased. Subsequently, after passage through the Oakes foam generator, it is determined that the resultant foam material in the coating manifold chamber has a substantially uniform density of about 20 pounds per cubic foot from point of entry into the coating manifold chamber to point of exit therefrom. The drop in pressure within the coating manifold chamber is less than 5 pounds per square inch gauge. The basic character of the foam in the coating manifold chamber is substantially unchanged. The exposure of the foam material to air from the time it is extruded through the opening of the nozzle to the time it is deposited on the continuously advancing sheet material is at a minimum.

The results of this Example are generally comparable to the results obtained in Example I. The thickness of the layer of foam material is found to be satisfactorily uniform across the full width of the sheet material. It is also relatively free of undesirable air bubbles, blisters, and blotches, as before. It is commercially acceptable as a floor covering.

EXAMPLE III

The procedures set forth in Example I are followed substantially as described therein with the exception that the amount and the concentration of the York White filler is decreased, whereby the specific gravity of the formulated resinous composition is also decreased. Subsequently, after passage through the Oakes mechanical foam generator, it is determined that the resultant foam material in the coating manifold chamber has a substantially uniform density of about 18 pounds per cubic foot from point of entry into the coating manifold chamber to point of exit therefrom. The drop in pressure within the coating manifold chamber is determined to be less than 5 pounds per square inch gauge. The basic character of the foam material in the coating manifold chamber is substantially unchanged during its passage therethrough. The exposure of the foam material to air from the time it is extruded through the opening of the nozzle of the coating manifold chamber to the time it is applied to the surface of the continuously advancing sheet material is a minimum.

The results of this Example are generally comparable to the results obtained in Example I. The thickness of the layer of foam material is found to be satisfactorily uniform in thickness across the full width of the sheet material. It is also substantially completely free of undesirable air bubbles, blisters, and blotches, in the form of large or irregular spots or blemishes. It is commercially acceptable as a floor covering.

Although specific Examples of the present inventive concept have been described in particularity, the same should not be construed as limiting the inventive concept to the specific features and/or materials mentioned therein. The present inventive concept is considered to include various other equivalent features and/or materials and is not to be limited except as defined by the scope of the claims appended hereto. It is to be understood that any suitable changes, modifications, and variations may be made without departing from the spirit and the scope of the present inventive concept.

What is claimed is:

1. Coating apparatus for spreading foam material substantially uniformly in thickness and relatively free of undesirable air bubbles, blisters, or blotches, in the form of large or irregular spots or blemishes, across the full width of continuously advancing sheet material comprising: a coating manifold for receiving foam material having a predetermined density and under a pressure of less than about 5 pounds per square inch gauge; a top plate clamped in air-tight fashion to the top of said coating manifold to prevent air from entering said coating manifold during use of the same; means to substantially completely fill said coating manifold with said foam material at said predetermined density and under said pressure; means to maintain the predetermined density of said foam material in said coating manifold substantially constant from point of entry thereto to point of exit therefrom; means comprising a pair of sloping or slanting walls which gradually and uniformly converge to form a nozzle having a relatively long, narrow slit, one of said pair of sloping or slanting walls being disposed at an angle of from about 4° to about 16° to the direction of movement of said continuously advancing sheet material for delivering said foam material from said coating manifold and spreading said foam material substantially uniformly in thickness and relatively free of undesirable air bubbles, blisters, or blotches, in the form of large or irregular spots or blemishes, across the full width of said continuously advancing sheet material passing immediately adjacent said delivering means; and means substantially in contact with the other of said sloping or slanting walls of said delivering means to regulate and control the amount and the thickness of said foam material being spread on said continuously advancing sheet material, whereby the time-exposure to air of said foam material before being spread on said continuously advancing sheet material is kept to a minimum.

2. Coating apparatus as defined in claim 1, wherein the cross-sectional area of said coating manifold through which the said foam material passes as it moves from its point of entry into said coating manifold to its point of exit therefrom is a constant or gradually decreases but doe not increase.

3. Coating apparatus as defined in claim 1, wherein the said means for delivering said foam material from said coating manifold is an orifice having an upper lip, and said means for regulating and controlling the amount and the thickness of said foam material being spread on said continuously advancing sheet material is a doctor blade, the upper lip of said orifice being in contact with said doctor blade.

4. Coating apparatus as defined in claim 1, wherein said sloping or slanting walls of said foam material delivering means converge at an angle of from about 16° to about 36°.

5. Coating apparatus as defined in claim 1, wherein said other of said sloping or slanting walls of said foam material delivering means approaches said means regulating and controlling the amount and the thickness of said foam material being spread on said continuously advancing sheet material at an angle of from about 50° to about 75°.

* * * * *